US012387733B2

(12) United States Patent
Coover et al.

(10) Patent No.: US 12,387,733 B2
(45) Date of Patent: Aug. 12, 2025

(54) METHODS AND APPARATUS TO FINGERPRINT AN AUDIO SIGNAL VIA NORMALIZATION

(71) Applicant: Gracenote, Inc., Emeryville, CA (US)

(72) Inventors: Robert Coover, Orinda, CA (US); Zafar Rafii, Berkeley, CA (US)

(73) Assignee: GRACENOTE, INC., New York, NY (US)

( * ) Notice: Subject to any disclaimer, the term of this patent is extended or adjusted under 35 U.S.C. 154(b) by 108 days.

(21) Appl. No.: 16/453,654

(22) Filed: Jun. 26, 2019

(65) Prior Publication Data

US 2020/0082835 A1 Mar. 12, 2020

(30) Foreign Application Priority Data

Sep. 7, 2018 (FR) ....................................... 1858041

(51) Int. Cl.
*G10L 19/02* (2013.01)
*G10L 25/18* (2013.01)
*G10L 25/51* (2013.01)

(52) U.S. Cl.
CPC .............. *G10L 19/02* (2013.01); *G10L 25/18* (2013.01); *G10L 25/51* (2013.01)

(58) Field of Classification Search
CPC .......... G10L 19/02; G10L 25/18; G10L 25/51
See application file for complete search history.

(56) References Cited

U.S. PATENT DOCUMENTS 9,202,472 B1 * 12/2015 Sharifi .................. G10L 19/018
9,299,364 B1 * 3/2016 Pereira .................... G06F 3/165
(Continued)

FOREIGN PATENT DOCUMENTS

JP 2006505821 2/2006
JP 2016518663 6/2016
(Continued)

OTHER PUBLICATIONS

Institut National De La Propriete Industrielle, "Written Communcation," mailed Jan. 21, 2019 in connection with French Patent Application No. FR1858041 (2 pages).
(Continued)

*Primary Examiner* — Thomas H Maung
(74) *Attorney, Agent, or Firm* — MCDONNELL BOEHNEN HULBERT & BERGHOFF LLP

(57) ABSTRACT

Methods, apparatus, systems, and articles of manufacture are disclosed to fingerprint audio via mean normalization. An example apparatus for audio fingerprinting includes a frequency range separator to transform an audio signal into a frequency domain, the transformed audio signal including a plurality of time-frequency bins including a first time-frequency bin, an audio characteristic determiner to determine a first characteristic of a first group of time-frequency bins of the plurality of time-frequency bins, the first group of time-frequency bins surrounding the first time-frequency bin and a signal normalizer to normalize the audio signal to thereby generate normalized energy values, the normalizing of the audio signal including normalizing the first time-frequency bin by the first characteristic. The example apparatus further includes a point selector to select one of the normalized energy values and a fingerprint generator to generate a fingerprint of the audio signal using the selected one of the normalized energy values.

17 Claims, 9 Drawing Sheets

(56) References Cited

U.S. PATENT DOCUMENTS

| | | | | |
|---|---|---|---|---|
| 9,390,719 | B1 * | 7/2016 | Roblek | G10L 19/022 |
| 2003/0086341 | A1 | 5/2003 | Wells et al. | |
| 2006/0020958 | A1 | 1/2006 | Allamanche et al. | |
| 2008/0215651 | A1 | 9/2008 | Sawada et al. | |
| 2009/0052784 | A1 | 2/2009 | Covell et al. | |
| 2011/0035035 | A1 | 2/2011 | Khan et al. | |
| 2011/0064244 | A1 | 3/2011 | Eisenberg et al. | |
| 2011/0261257 | A1 * | 10/2011 | Terry | G06K 9/00221 348/515 |
| 2012/0103166 | A1 | 5/2012 | Shibuya et al. | |
| 2013/0279704 | A1 | 10/2013 | Crockett | |
| 2014/0114456 | A1 | 4/2014 | Stavropoulos et al. | |
| 2014/0180674 | A1 | 6/2014 | Neuhauser et al. | |
| 2014/0310006 | A1 * | 10/2014 | Anguera Miro | G10L 19/018 704/500 |
| 2016/0148620 | A1 | 5/2016 | Bilobrov | |
| 2016/0247512 | A1 | 8/2016 | Duong et al. | |
| 2017/0365276 | A1 | 12/2017 | Greene | |
| 2019/0130032 | A1 | 5/2019 | Donier et al. | |
| 2019/0139557 | A1 | 5/2019 | Hodgson et al. | |
| 2021/0157838 | A1 | 5/2021 | Berrian et al. | |

FOREIGN PATENT DOCUMENTS

| | | |
|---|---|---|
| KR | 1020130055115 A | 5/2013 |
| KR | 20170027648 | 3/2017 |
| KR | 20180135464 | 12/2018 |

OTHER PUBLICATIONS

Institut National De La Propriete Industrielle, "Preliminary Search Report," mailed Jul. 26, 2019 in connection with French Patent Application No. FR1858041 (9 pages).

Wooram Son et al., "Sub-fingerprint Masking for a Robust Audio Fingerprinting System in a Real-noise Environment for Portable Consumer Devices," 2010 Digest of Technical Papers/International Conference on Consumer Electronics (ICCE 2010), Las Vegas, Nevada, Jan. 9-13, 2010, pp. 409-410, 2 pages.

International Searching Authority, "International Search Report," mailed Dec. 23, 2019 in connection with International Patent Application No. PCT/US2019/049953, 3 pages.

International Searching Authority, "Written Opinion," mailed Dec. 23, 2019 in connection with International Patent Application No. PCT/US2019/049953, 5 pages.

International Bureau, "International Preliminary Report on Patentability," mailed Mar. 9, 2021 in connection with International Patent Application No. PCT/US2019/049953, 7 pages.

European Patent Office, "Communication pursuant to Rules 161(2) and 162 EPC," issued in connection with European Patent Application No. 19857365.1, dated Apr. 14, 2021, 3 pages.

Institut National De La Propriete Industrielle, "Notice of Intention to Grant," issued Feb. 11, 2021 in connection with French patent application No. 18 58041, 2 pages. (English summary included).

Canadian Intellectual Property Office, "Search Report", issued in connection with Canadian Patent Application No. 3,111,800 on Mar. 7, 2022, 4 pages.

Australian Intellectual Property Office, "Examination Report", issued in connection with Australian Patent Application No. 2019335404 on Jan. 27, 2022, 3 pages.

International Searching Authority, "Written Opinion of the International Searching Authority", issued in connection with International Patent Application No. PCT/US2020/061077 on Mar. 5, 2021, 3 pages.

International Searching Authority, "International Search Report" issued in connection with International Patent Application No. PCT/US2020/061077 on Mar. 5, 2021, 3 pages.

International Searching Authority, "Written Opinion of the International Searching Authority", issued in connection with International Patent Application No. PCT/US2022/015442 on May 18, 2022, 3 pages.

International Searching Authority, "International Search Report", issued in connection with International Patent Application No. PCT/US2022/015442 on May 18, 2022, 4 pages.

European Patent Office, "Communication of of European Publication Number and Information on the Application of Article 67(3) EPC", issued in connection with European Patent Application No. 20891501.7 on Sep. 7, 2022, 1 page.

International Searching Authority, "International Preliminary Report on Patentability", issued in connection with International Patent Application No. PCT/US2020/061077 on May 17, 2022, 4 pages.

Japanese Patent Office, "Notice for Reasons of Rejection", issued in connection with Japanese Patent Application No. 21-512712 on Apr. 26, 2022, 6 pages.

European Patent Office, "Extended Search Report", issued in connection with European Patent Application No. 19857365.1 on Jun. 7, 2022, 8 pages.

European Patent Office, "Communication Pursuant to Rule 161(2) and 162 EPC", issued in connection with European Patent Application No. 20891501.7 on Jul. 5, 2022, 3 pages.

IP Australia, "Notice of Acceptance for Patent Application", issued in connection with Australian Patent Application No. 2019335404 on Aug. 10, 2022, 3 pages.

European Patent Office, "Communication Pursuant to Rules 70(2) and 70a(2) EPC", issued in connection with European Patent Application No. 19857365.1 on Jun. 24, 2022, 1 page.

* cited by examiner

METHODS AND APPARATUS TO FINGERPRINT AN AUDIO SIGNAL VIA NORMALIZATION

RELATED APPLICATION

This patent claims priority to, and benefit of, French Patent Application Serial No. 1858041, which was filed on Sep. 7, 2018. French Patent Application Serial No. 1858041 is hereby incorporated by reference in its entirety.

FIELD OF THE DISCLOSURE

This disclosure relates generally to audio signals and, more particularly, to methods and apparatus to fingerprint an audio signal via normalization.

BACKGROUND

Audio information (e.g., sounds, speech, music, etc.) can be represented as digital data (e.g., electronic, optical, etc.). Captured audio (e.g., via a microphone) can be digitized, stored electronically, processed and/or cataloged. One way of cataloging audio information is by generating an audio fingerprint. Audio fingerprints are digital summaries of audio information created by sampling a portion of the audio signal. Audio fingerprints have historically been used to identify audio and/or verify audio authenticity.

BRIEF DESCRIPTION OF THE DRAWINGS

The figures are not to scale. In general, the same reference numbers will be used throughout the drawing(s) and accompanying written description to refer to the same or like parts.

DETAILED DESCRIPTION

Figure 1:
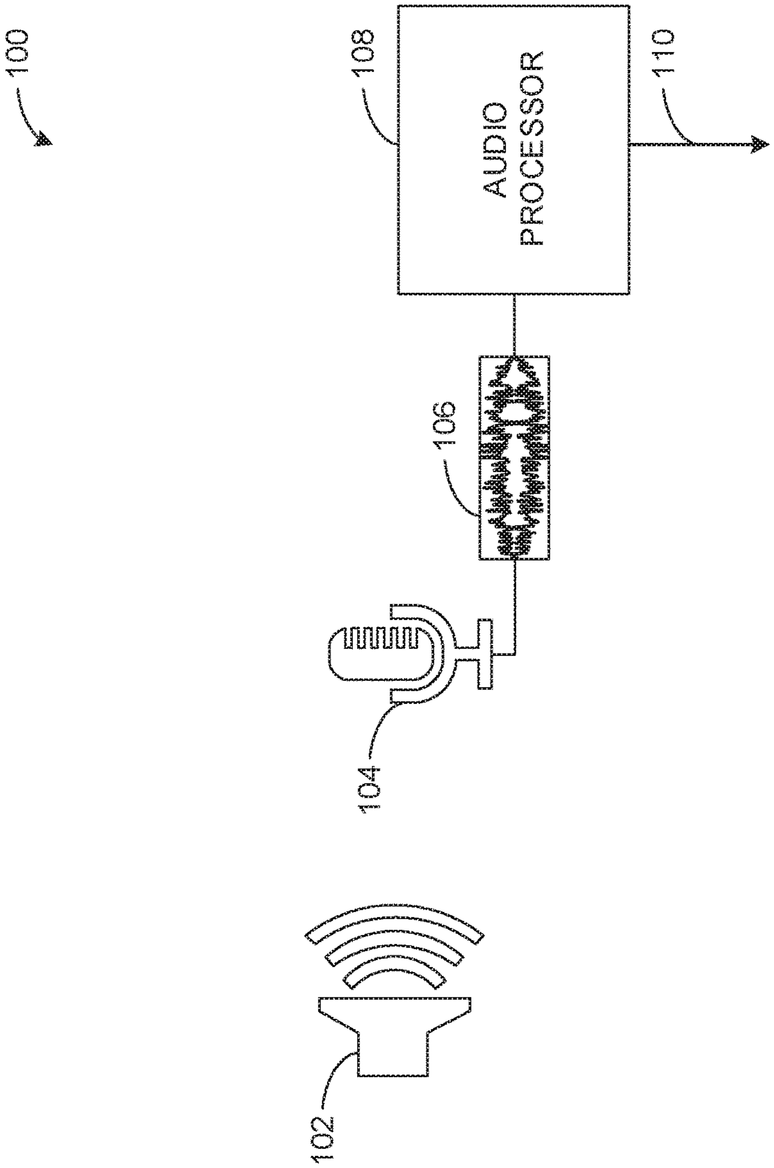
FIG. 1 is an example system on which the teachings of this disclosure may be implemented.

Fingerprint or signature-based media monitoring techniques generally utilize one or more inherent characteristics of the monitored media during a monitoring time interval to generate a substantially unique proxy for the media. Such a proxy is referred to as a signature or fingerprint, and can take any form (e.g., a series of digital values, a waveform, etc.) representative of any aspect(s) of the media signal(s) (e.g., the audio and/or video signals forming the media presentation being monitored). A signature can be a series of signatures collected in series over a time interval. The term "fingerprint" and "signature" are used interchangeably herein and are defined herein to mean a proxy for identifying media that is generated from one or more inherent characteristics of the media.

Signature-based media monitoring generally involves determining (e.g., generating and/or collecting) signature(s) representative of a media signal (e.g., an audio signal and/or a video signal) output by a monitored media device and comparing the monitored signature(s) to one or more references signatures corresponding to known (e.g., reference) media sources. Various comparison criteria, such as a cross-correlation value, a Hamming distance, etc., can be evaluated to determine whether a monitored signature matches a particular reference signature.

When a match between the monitored signature and one of the reference signatures is found, the monitored media can be identified as corresponding to the particular reference media represented by the reference signature that with matched the monitored signature. Because attributes, such as an identifier of the media, a presentation time, a broadcast channel, etc., are collected for the reference signature, these attributes can then be associated with the monitored media whose monitored signature matched the reference signature. Example systems for identifying media based on codes and/or signatures are long known and were first disclosed in Thomas, U.S. Pat. No. 5,481,294, which is hereby incorporated by reference in its entirety.

Historically, audio fingerprinting technology has used the loudest parts (e.g., the parts with the most energy, etc.) of an audio signal to create fingerprints in a time segment. However, in some cases, this method has several severe limitations. In some examples, the loudest parts of an audio signal can be associated with noise (e.g., unwanted audio) and not from the audio of interest. For example, if a user is attempting to fingerprint a song at a noisy restaurant, the loudest parts of a captured audio signal can be conversations between the restaurant patrons and not the song or media to be identified. In this example, many of the sampled portions of the audio signal would be of the background noise and not of the music, which reduces the usefulness of the generated fingerprint.

Another potential limitation of previous fingerprinting technology is that, particularly in music, audio in the bass frequency range tends to be loudest. In some examples, the dominant bass frequency energy results in the sampled portions of the audio signal being predominately in the bass frequency range. Accordingly, fingerprints generated using existing methods usually do not include samples from all parts of the audio spectrum that can be used for signature matching, especially in higher frequency ranges (e.g., treble ranges, etc.).

Example methods and apparatus disclosed herein overcome the above problems by generating a fingerprint from an audio signal using mean normalization. An example method includes normalizing one or more of the time-frequency bins of the audio signal by an audio characteristic of the surrounding audio region. As used herein, "a time-frequency bin" is a portion of an audio signal corresponding to a specific frequency bin (e.g., an FFT bin) at a specific time (e.g., three seconds into the audio signal). In some examples, the normalization is weighted by an audio category of the audio signal. In some examples, a fingerprint is generated by selecting points from the normalized time-frequency bins.

Another example method disclosed herein includes dividing an audio signal into two or more audio signal frequency components. As used herein, "an audio signal frequency component," is a portion of an audio signal corresponding to a frequency range and a time period. In some examples, an audio signal frequency component can be composed of a plurality of time-frequency bins. In some examples, an audio characteristic is determined for some of the audio signal frequency component. In this example, each of the audio signal frequency components are normalized by the associated audio characteristic (e.g., an audio mean, etc.). In some examples, a fingerprint is generated by selecting points from the normalized audio signal frequency components.

FIG. 1 is an example system 100 on which the teachings of this disclosure can be implemented. The example system 100 includes an example audio source 102, an example microphone 104 that captures sound from the audio source 102 and converts the captured sound into an example audio signal 106. An example audio processor 108 receives the audio signal 106 and generates an example fingerprint 110.

The example audio source 102 emits an audible sound. The example audio source can be a speaker (e.g., an electroacoustic transducer, etc.), a live performance, a conversation and/or any other suitable source of audio. The example audio source 102 can include desired audio (e.g., the audio to be fingerprinted, etc.) and can also include undesired audio (e.g., background noise, etc.). In the illustrated example, the audio source 102 is a speaker. In other examples, the audio source 102 can be any other suitable audio source (e.g., a person, etc.).

The example microphone 104 is a transducer that converts the sound emitted by the audio source 102 into the audio signal 106. In some examples, the microphone 104 can be a component of a computer, a mobile device (a smartphone, a tablet, etc.), a navigation device or a wearable device (e.g., a smart watch, etc.). In some examples, the microphone can include an audio-to digital convert to digitize the audio signal 106. In other examples, the audio processor 108 can digitize the audio signal 106.

The example audio signal 106 is a digitized representation of the sound emitted by the audio source 102. In some examples, the audio signal 106 can be saved on a computer before being processed by the audio processor 108. In some examples, the audio signal 106 can be transferred over a network to the example audio processor 108. Additionally or alternatively, any other suitable method can be used to generate the audio (e.g., digital synthesis, etc.).

The example audio processor 108 converts the example audio signal 106 into an example fingerprint 110. In some examples, the audio processor 108 divides the audio signal 106 into frequency bins and/or time periods and, then, determines the mean energy of one or more of the created audio signal frequency components. In some examples, the audio processor 108 can normalize an audio signal frequency component using the associated mean energy of the audio region surrounding each time-frequency bin. In other examples, any other suitable audio characteristic can be determined and used to normalize each time-frequency bin. In some examples, the fingerprint 110 can be generated by selecting the highest energies among the normalized audio signal frequency components. Additionally or alternatively, any suitable means can be used to generate the fingerprint 110. An example implementation of the audio processor 108 is described below in conjunction with FIG. 2.

The example fingerprints 110 is a condensed digital summary of the audio signal 106 that can be used to the identify and/or verify the audio signal 106. For example, the fingerprint 110 can be generated by sampling portions of the audio signal 106 and processing those portions. In some examples, the fingerprint 110 can include samples of the highest energy portions of the audio signal 106. In some examples, the fingerprint 110 can be indexed in a database that can be used for comparison to other fingerprints. In some examples, the fingerprint 110 can be used to identify the audio signal 106 (e.g., determine what song is being played, etc.). In some examples, the fingerprint 110 can be used to verify the authenticity of the audio.

Figure 2:
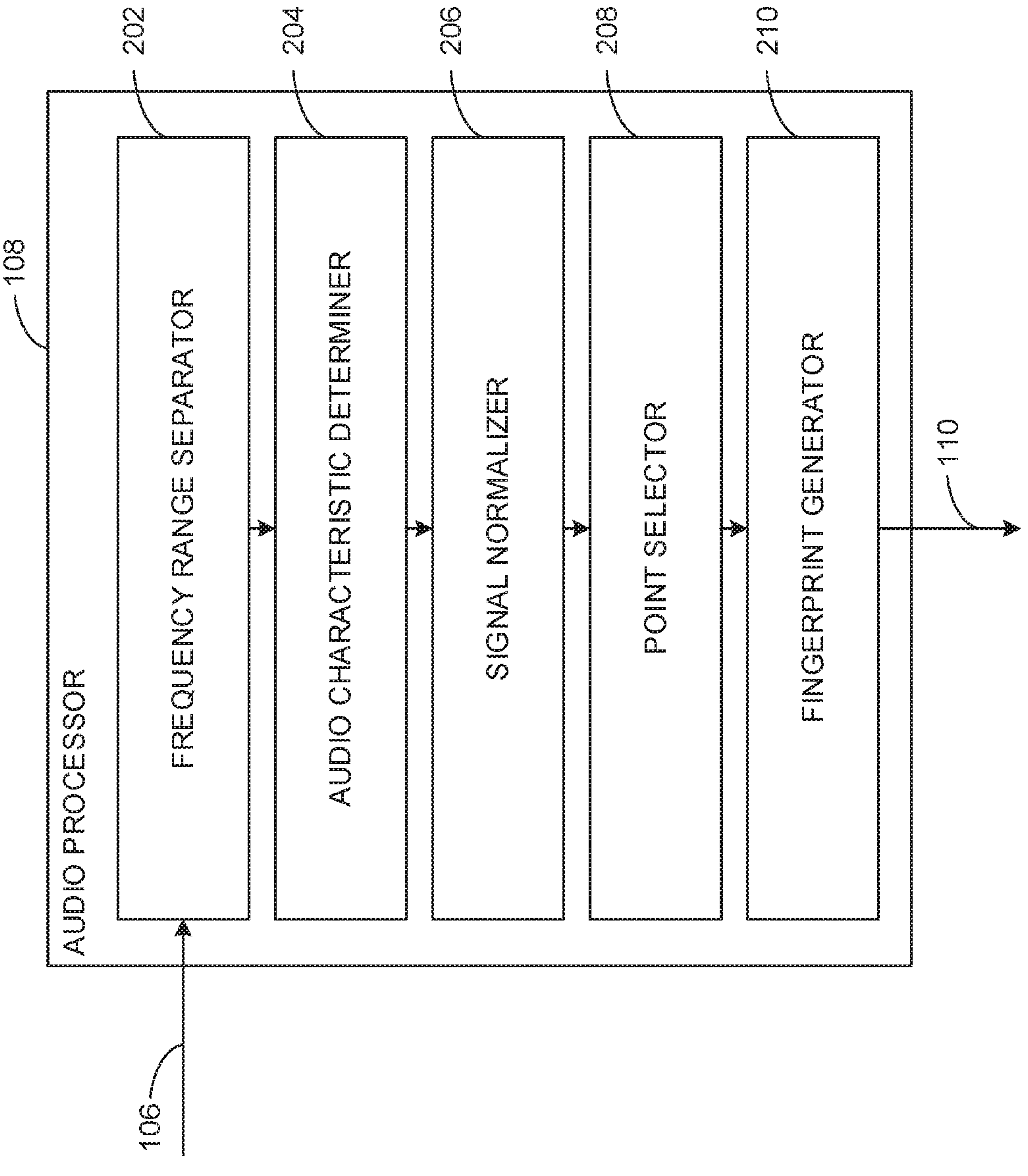
FIG. 2 is an example implementation of the audio processor of FIG. 1.

FIG. 2 is an example implementation of the audio processor 108 of FIG. 1. The example audio processor 108 includes an example frequency range separator 202, an example audio characteristic determiner 204, an example signal normalizer 206, an example point selector 208 and an example fingerprint generator 210.

The example frequency range separator 202 divides an audio signal (e.g., the digitized audio signal 106 of FIG. 1) into time-frequency bins and/or audio signal frequency components. For example, the frequency range separator 202 can perform a fast Fourier transform (FFT) on the audio signal 106 to transform the audio signal 106 into the frequency domain. Additionally, the example frequency range separator 202 can divide the transformed audio signal 106 into two or more frequency bins (e.g., using a Hamming function, a Hann function, etc.). In this example, each audio signal frequency component is associated with a frequency bin of the two or more frequency bins. Additionally or alternatively, the frequency range separator 202 can aggregate the audio signal 106 into one or more periods of time (e.g., the duration of the audio, six second segments, 1 second segments, etc.). In other examples, the frequency range separator 202 can use any suitable technique to transform the audio signal 106 (e.g., discrete Fourier transforms, a sliding time window Fourier transform, a wavelet transform, a discrete Hadamard transform, a discrete Walsh Hadamard, a discrete cosine transform, etc.). In some examples, the frequency range separator 202 can be implemented by one or more band-pass filters (BPFs). In some examples, the output of the example frequency range separator 202 can be represented by a spectrogram. An example output of the frequency range separator 202 is discussed below in conjunction with FIGS. 3A-B and 4.

The example audio characteristic determiner 204 determines the audio characteristics of a portion of the audio signal 106 (e.g., an audio signal frequency component, an audio region surrounding a time-frequency bin, etc.). For example, the audio characteristic determiner 204 can determine the mean energy (e.g., average power, etc.) of one or more of the audio signal frequency component(s). Additionally or alternatively, the audio characteristic determiner 204 can determine other characteristics of a portion of the audio signal (e.g., the mode energy, the median energy, the mode power, the median energy, the mean energy, the mean amplitude, etc.).

The example signal normalizer 206 normalizes one or more time-frequency bins by an associated audio characteristic of the surrounding audio region. For example, the signal normalizer 206 can normalize a time-frequency bin by a mean energy of the surrounding audio region. In other examples, the signal normalizer 206 normalizes some of the audio signal frequency components by an associated audio characteristic. For example, the signal normalizer 206 can normalize each time-frequency bin of an audio signal frequency component using the mean energy associated with that audio signal component. In some examples, the output of the signal normalizer 206 (e.g., a normalized time-frequency bin, a normalized audio signal frequency components, etc.) can be represented as a spectrogram. Example outputs of the signal normalizer 206 are discussed below in conjunction with FIGS. 3C and 5.

The example point selector 208 selects one or more points from the normalized audio signal to be used to generate the fingerprint 110. For example, the example point selector 208 can select a plurality of energy maxima of the normalized audio signal. In other examples, the point selector 208 can select any other suitable points of the normalized audio.

Additionally or alternatively, the point selector 208 can weigh the selection of points based on a category of the audio signal 106. For example, the point selector 208 can weigh the selection of points into common frequency ranges of music (e.g., bass, treble, etc.) if the category of the audio signal is music. In some examples, the point selector 208 can determine the category of an audio signal (e.g., music, speech, sound effects, advertisements, etc.). The example fingerprint generator 210 generates a fingerprint (e.g., the fingerprint 110) using the points selected by the example point selector 208. The example fingerprint generator 210 can generate a fingerprint from the selected points using any suitable method.

While an example manner of implementing the audio processor 108 of FIG. 1 is illustrated in FIG. 2, one or more of the elements, processes, and/or devices illustrated in FIG. 2 may be combined, divided, re-arranged, omitted, eliminated, and/or implemented in any other way. Further, the example frequency range separator 202, the example audio characteristic determiner 204, the example signal normalizer 206, the example point selector 208 and an example fingerprint generator 210 and/or, more generally, the example audio processor 108 of FIGS. 1 and 2 may be implemented by hardware, software, firmware, and/or any combination of hardware, software, and/or firmware. Thus, for example, any of the example frequency range separator 202, the example audio characteristic determiner 204, the example signal normalizer 206, the example point selector 208 and an example fingerprint generator 210, and/or, more generally, the example audio processor 108 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)). When reading any of the apparatus or system claims of this patent to cover a purely software and/or firmware implementation, at least one of the example frequency range separator 202, the example audio characteristic determiner 204, the example signal normalizer 206, the example point selector 208 and an example fingerprint generator 210 is/are hereby expressly defined to include a non-transitory computer readable storage device or storage disk such as a memory, a digital versatile disk (DVD), a compact disk (CD), a Blu-ray disk, etc., including the software and/or firmware. Further still, the example audio processor 106 of FIGS. 1 and 2 may include one or more elements, processes, and/or devices in addition to, or instead of, those illustrated in FIG. 2, and/or may include more than one of any or all of the illustrated elements, processes, and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 3C:
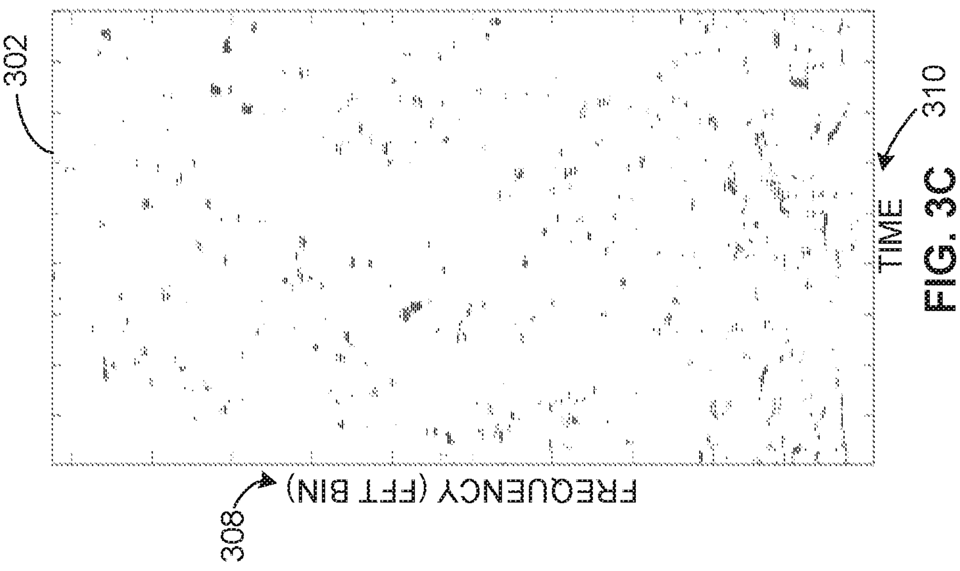
FIG. 3C depicts an example of a normalized spectrogram generated by the signal normalizer of FIG. 2 from the unprocessed spectrogram of FIGS. 3A and 3B.
Figure 3B:
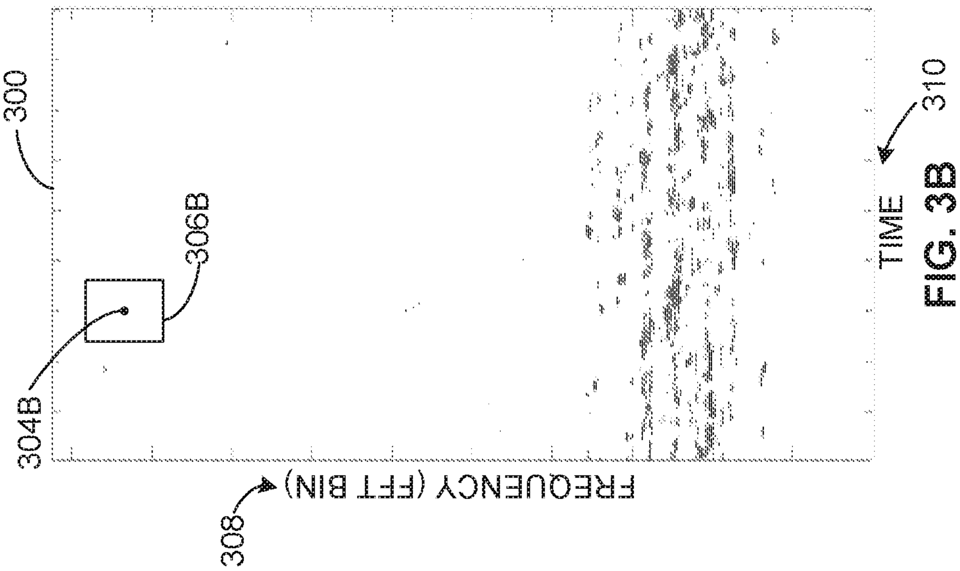
FIGS. 3A and 3B depict an example unprocessed spectrogram generated by the example frequency range separator of FIG. 2.
Figure 3A:
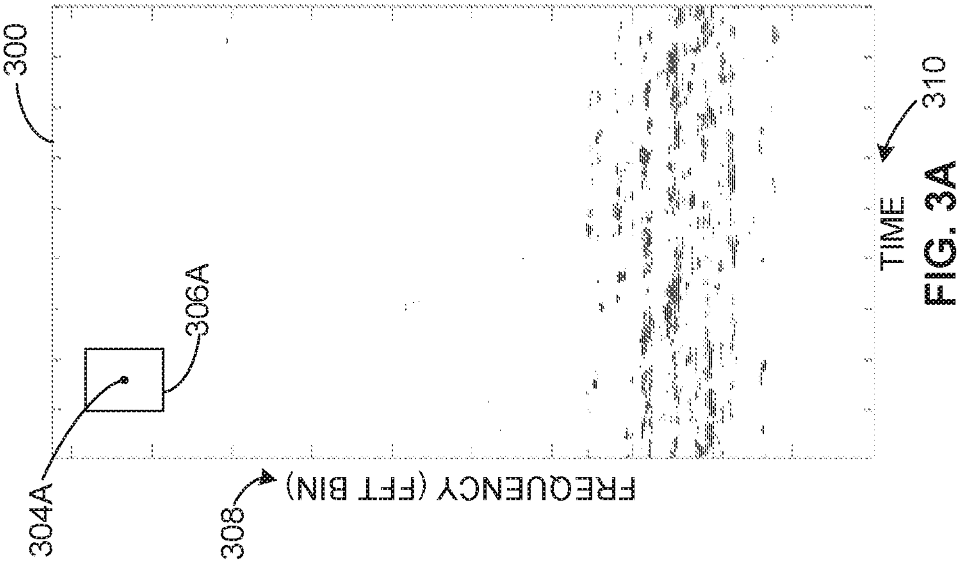

FIGS. 3A-3B depict an example unprocessed spectrogram 300 generated by the example frequency range separator of FIG. 2. In the illustrated example of FIG. 3A, the example unprocessed spectrogram 300 includes an example first time-frequency bin 304A surrounded by an example first audio region 306A. In the illustrated example of FIG. 3B, the example unprocessed spectrogram includes an example second time-frequency bin 304B surrounded by an example audio region 306B. The example unprocessed spectrogram 300 of FIGS. 3A and 3B and the normalized spectrogram 302 each includes an example vertical axis 308 denoting frequency bins and an example horizontal axis 310 denoting time bins. FIGS. 3A and 3B illustrate the example audio regions 306A and 306B from which the normalization audio characteristic is derived by the audio characteristic determiner 204 and used by the signal normalizer 206 to normalize the first time-frequency bins 304A and second time-frequency bin 304B, respectively. In the illustrated example, each time-frequency bin of the unprocessed spectrogram 300 is normalized to generate the normalized spectrogram 302. In other examples, any suitable number of the time-frequency bins of the unprocessed spectrogram 300 can be normalized to generate the normalized spectrogram 302 of FIG. 3C.

The example vertical axis 308 has frequency bin units generated by a fast Fourier Transform (FFT) and has a length of 1024 FFT bins. In other examples, the example vertical axis 308 can be measured by any other suitable techniques of measuring frequency (e.g., Hertz, another transformation algorithm, etc.). In some examples, the vertical axis 308 encompasses the entire frequency range of the audio signal 106. In other examples, the vertical axis 308 can encompass a portion of the audio signal 106.

In the illustrated examples, the example horizontal axis 310 represents a time period of the unprocessed spectrogram 300 that has a total length of 11.5 seconds. In the illustrated example, horizontal axis 310 has sixty-four milliseconds (ms) intervals as units. In other examples, the horizontal axis 310 can be measured in any other suitable units (e.g., 1 second, etc.). For example, the horizontal axis 310 encompasses the complete duration of the audio. In other examples, the horizontal axis 310 can encompass a portion of the duration of the audio signal 106. In the illustrated example, each time-frequency bin of the spectrograms 300, 302 has a size of 64 ms by 1 FFT bin.

In the illustrated example of FIG. 3A, the first time-frequency bin 304A is associated with an intersection of a frequency bin and a time bin of the unprocessed spectrogram 300 and a portion of the audio signal 106 associated with the intersection. The example first audio region 306A includes the time-frequency bins within a pre-defined distance away from the example first time-frequency bin 304A. For example, the audio characteristic determiner 204 can determine the vertical length of the first audio region 306A (e.g., the length of the first audio region 306A along the vertical axis 308, etc.) based by a set number of FFT bins (e.g., 5 bins, 11 bins, etc.). Similarly, the audio characteristic determiner 204 can determine the horizontal length of the first audio region 306A (e.g., the length of the first audio region 306A along the horizontal axis 310, etc.). In the illustrated example, the first audio region 306A is a square. Alternatively, the first audio region 306A can be any suitable size and shape and can contain any suitable combination of time-frequency bins (e.g., any suitable group of time-frequency bins, etc.) within the unprocessed spectrogram 300. The example audio characteristic determiner 204 can then determine an audio characteristic of time-frequency bins contained within the first audio region 306A (e.g., mean energy, etc.). Using the determined audio characteristic, the example signal normalizer 206 of FIG. 2 can normalize an associated value of the first time-frequency bin 304A (e.g., the energy of first time-frequency bin 304A can be normalized by the mean energy of each time-frequency bin within the first audio region 306A).

In the illustrated example of FIG. 3B, the second time-frequency bin 304B is associated with an intersection of a frequency bin and a time bin of the unprocessed spectrogram 300 and a portion of the audio signal 106 associated with the intersection. The example second audio region 306B includes the time-frequency bins within a pre-defined distance away from the example second time-frequency bin 304B. Similarly, the audio characteristic determiner 204 can determine the horizontal length of the second audio region 306B (e.g., the length of the second audio region 306B along the horizontal axis 310, etc.). In the illustrated example, the second audio region 306B is a square. Alternatively, the second audio region 306B can be any suitable size and shape and can contain any suitable combination of time-frequency bins (e.g., any suitable group of time-frequency bins, etc.) within the unprocessed spectrogram 300. In some examples, the second audio region 306B can overlap with the first audio region 306A (e.g., contain some of the same time-frequency bins, be displaced on the horizontal axis 310, be displaced on the vertical axis 308, etc.). In some examples, the second audio region 306B can be the same size and shape of the first audio region 306A. In other examples, the second audio region 306B can be a different size and shape than the first audio region 306A. The example audio characteristic determiner 204 can then determine an audio characteristic of time-frequency bins contained with the second audio region 306B (e.g., mean energy, etc.). Using the determined audio characteristic, the example signal normalizer 206 of FIG. 2 can normalize an associated value of the second time-frequency bin 304B (e.g., the energy of second time-frequency bin 304B can be normalized by the mean energy of the bins located within the second audio region 306B).

FIG. 3C depicts an example of a normalized spectrogram 302 generated by the signal normalizer of FIG. 2 by normalizing a plurality of the time-frequency bins of the unprocessed spectrogram 300 of FIGS. 3A-3B. For example, some or all of the time-frequency bins of the unprocessed spectrogram 300 can be normalized in a manner similar to how as the time-frequency bins 304A and 304B were normalized. An example process 700 to generate the normalized spectrogram is described in conjunction with FIG. 7. The resulting frequency bins of FIG. 3C have now been normalized by the local mean energy within the local area around the region. As a result, the darker regions are areas that have the most energy in their respective local area. This allows the fingerprint to incorporate relevant audio features even in areas that are low in energy relative to the usual louder bass frequency area.

Figure 4:
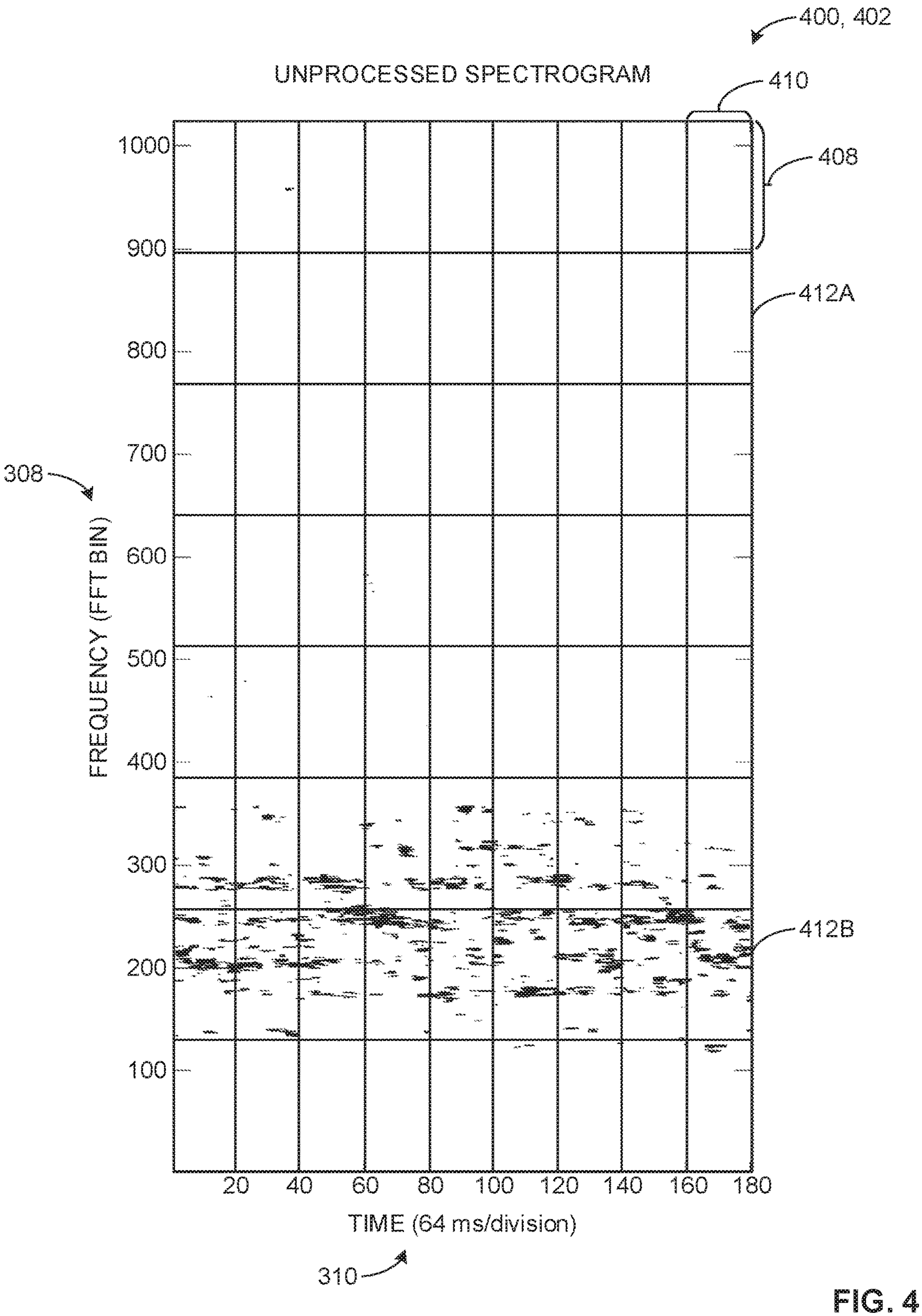
FIG. 4 is an example unprocessed spectrogram of FIGS. 3A and 3B divided into fixed audio signal frequency components.

FIG. 4 illustrates the example unprocessed spectrogram 300 of FIG. 3 divided into fixed audio signal frequency components. The example unprocessed spectrogram 300 is generated by processing the audio signal 106 with a fast Fourier transform (FFT). In other examples, any other suitable method can be used to generate the unprocessed spectrogram 300. In this example, the unprocessed spectrogram 300 is divided into example audio signal frequency components 402. The example unprocessed spectrogram 400 includes the example vertical axis 308 of FIG. 3 and the example horizontal axis 310 of FIG. 3. In the illustrated example, the example audio signal frequency components 402 each have an example frequency range 408 and an example time period 410. The example audio signal frequency components 402 include an example first audio signal frequency component 412A and an example second audio signal frequency component 412B. In the illustrated example, the darker portions of the unprocessed spectrogram 300 represent portions of the audio signal 106 with higher energies.

The example audio signal frequency components 402 each are associated with a unique combination of successive frequency ranges (e.g., a frequency bin, etc.) and successive time periods. In the illustrated example, each of the audio signal frequency components 402 has a frequency bin of equal size (e.g., the frequency range 408). In other examples, some or all of the audio signal frequency components 402 can have frequency bins of different sizes. In the illustrated example, each of the audio signal frequency components 402 has a time period of equal duration (e.g., the time period 410). In other examples, some or all of the audio signal frequency components 402 can have time periods of different durations. In the illustrated example, the audio signal frequency components 402 compose the entirety of the audio signal 106. In other examples, the audio signal frequency components 402 can include a portion of the audio signal 106.

In the illustrated example, the first audio signal frequency component 412A is in the treble range of the audio signal 106 and has no visible energy points. The example first audio signal frequency component 412A is associated with a frequency bin between the 768 FFT bin and the 896 FFT bin and a time period between 10,024 ms and 11,520 ms. In some examples, there are portions of the audio signal 106 within the first audio signal frequency component 412A. In this example, the portions of the audio signal 106 within the audio signal frequency component 412A are not visible due to the comparatively higher energy of the audio within the bass spectrum of the audio signal 106 (e.g., the audio in the second audio signal frequency component 412B, etc.). The second audio signal frequency component 412B is in the bass range of the audio signal 106 and visible energy points. The example second audio signal frequency component 412B is associated with a frequency bin between 128 FFT bin and 256 FFT bin and a time period between 10,024 ms and 11,520 ms. In some examples, because the portions of the audio signal 106 within the bass spectrum (e.g., the second audio signal frequency component 412B, etc.) have a comparatively higher energy, a fingerprint generated from the unprocessed spectrogram 300 would include a disproportional number of samples from the bass spectrum.

Figure 5:
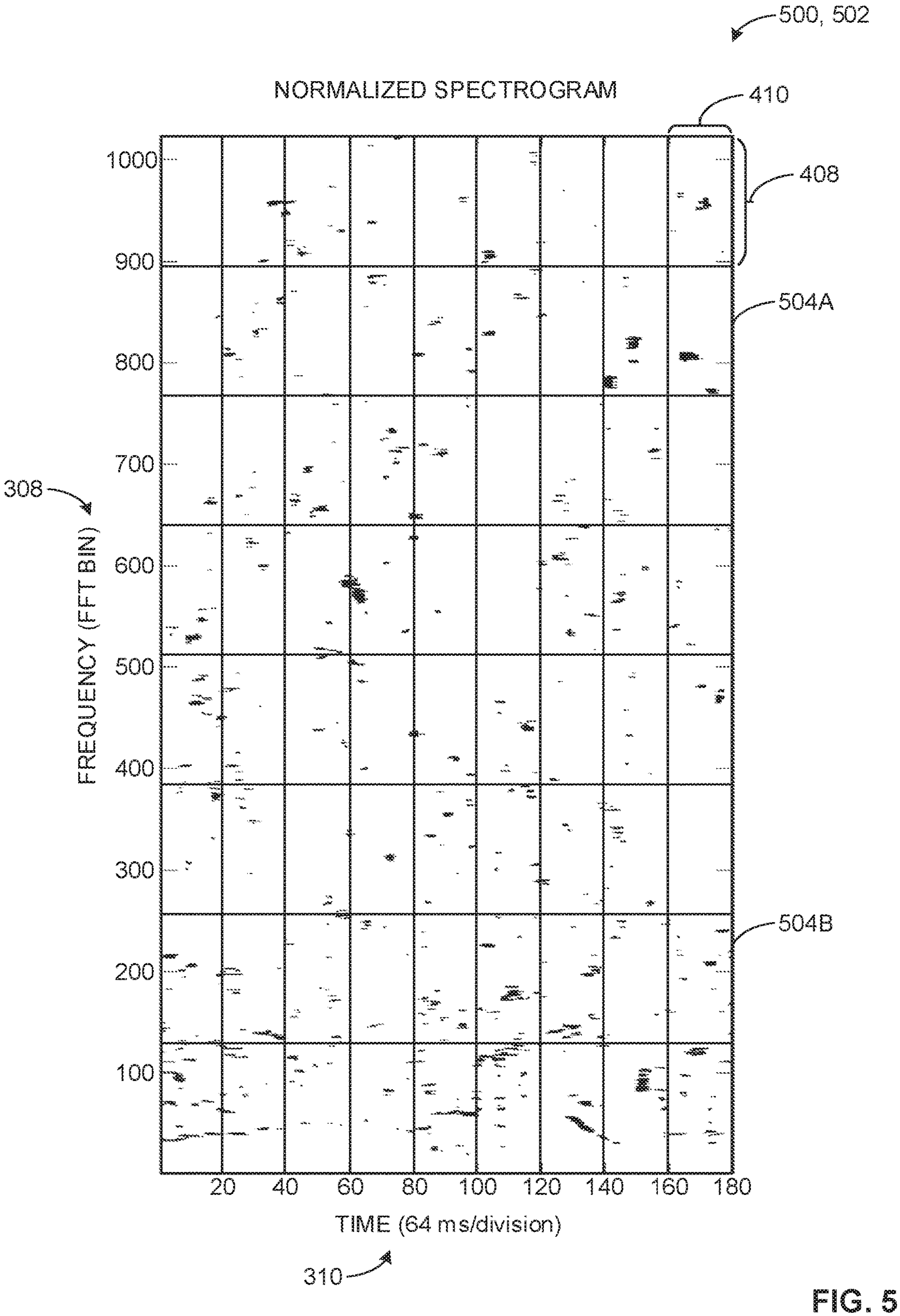
FIG. 5 is an example of a normalized spectrogram generated by the signal normalizer of FIG. 2 from the fixed audio signal frequency components of FIG. 4.

FIG. 5 is an example of a normalized spectrogram 500 generated by the signal normalizer of FIG. 2 from the fixed audio signal frequency components of FIG. 4. The example normalized spectrogram 500 includes the example vertical axis 308 of FIG. 3 and the example horizontal axis 310 of FIG. 3. The example normalized spectrogram 500 is divided into example audio signal frequency components 502. In the illustrated example, the audio signal frequency components 502 each have an example frequency range 408 and an example time period 410. The example audio signal frequency components 502 include an example first audio signal frequency component 504A and an example second audio signal frequency component 504B. In some examples, the first and second audio signal frequency components 504A and 504B correspond to the same frequency bins and time periods as the first and second audio signal frequency components 412A and 412B of FIG. 3. In the illustrated example, the darker portions of the normalized spectrogram 500 represent areas of audio spectrum with higher energies.

The example normalized spectrogram 500 is generated by normalizing the unprocessed spectrogram 300 by normalizing each audio signal frequency component 402 of FIG. 4 by an associated audio characteristic. For example, the audio characteristic determiner 204 can determine an audio characteristic (e.g., the mean energy, etc.) of the first audio signal frequency component 412A. In this example, the signal normalizer 206 can then normalize the first audio signal frequency component 412A by the determined audio characteristic to the create the example audio signal frequency component 402A. Similarly, the example second audio signal frequency component 402B can be generated by normalizing the second audio signal frequency component 412B of FIG. 4 by an audio characteristic associated with the second audio signal frequency component 412B. In other examples, the normalized spectrogram 500 can be generated by normalizing a portion of the audio signal components 402. In other examples, any other suitable method can be used to generate the example normalized spectrogram 500.

In the illustrated example of FIG. 5, the first audio signal frequency component 504A (e.g., the first audio signal frequency component 412A of FIG. 4 after being processed by the signal normalizer 206, etc.) has visible energy points on the normalized spectrogram 500. For example, because the first audio signal frequency component 504A has been normalized by the energy of the first audio signal frequency component 412A, previously hidden portions of the audio signal 106 (e.g., when compared to the first audio signal frequency component 412A) are visible on the normalized spectrogram 500. The second audio signal frequency component 504B (e.g., the second audio signal frequency component 412B of FIG. 4 after being processed by the signal normalizer 206, etc.) corresponds to the bass range of the audio signal 106. For example, because the second audio signal frequency component 504B has been normalized by the energy of the second audio signal frequency component 412B, the amount of visible energy points has been reduced (e.g., when compared to the second audio signal frequency component 412B). In some examples, a fingerprint generated from the normalized spectrogram 500 (e.g., the fingerprint 110 of FIG. 1) would include samples from more evenly distributed from the audio spectrum than a fingerprint generated from the unprocessed spectrogram 300 of FIG. 4.

Figure 6:
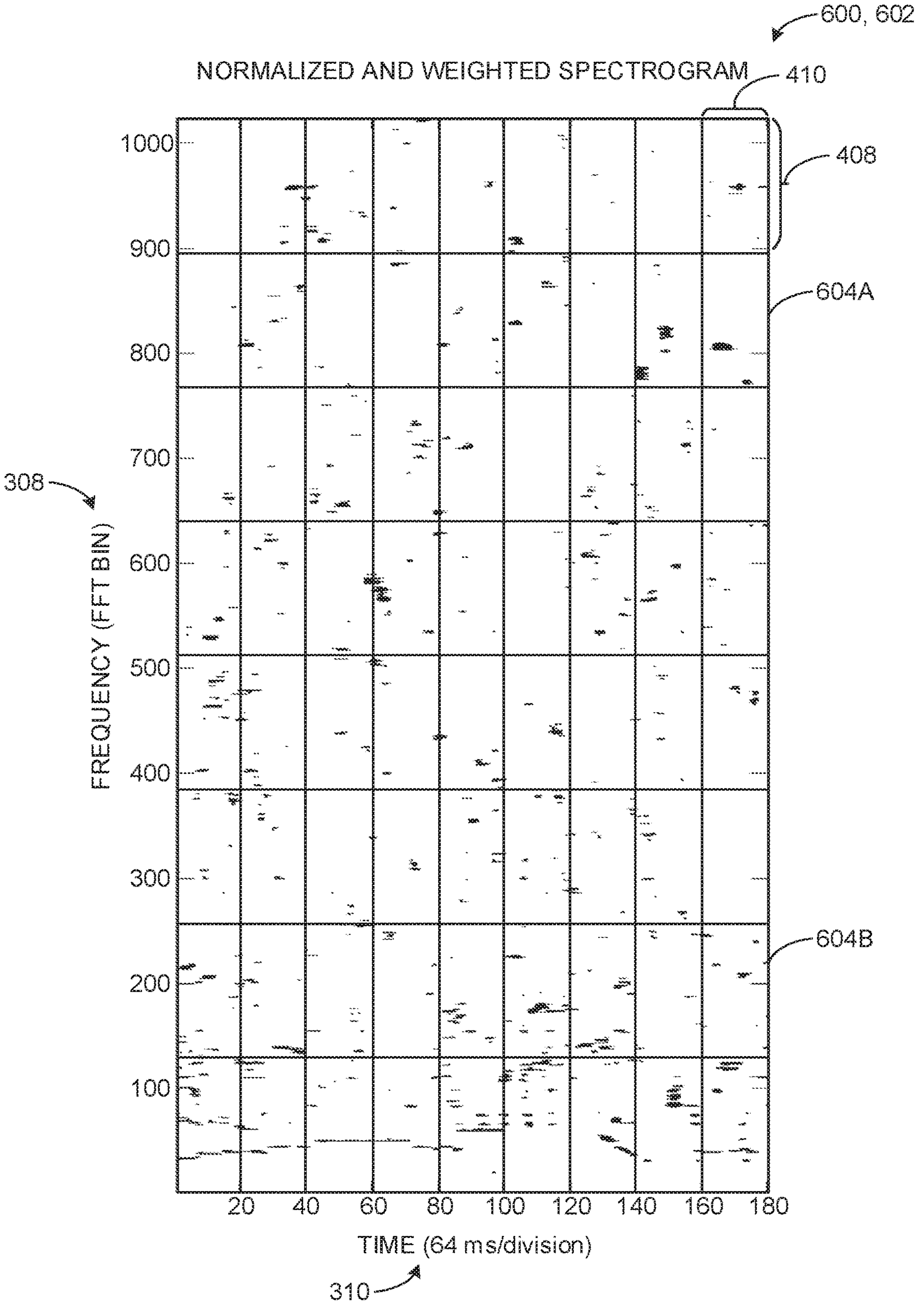
FIG. 6 is an example of a normalized and weighted spectrogram generated by the point selector of FIG. 2 from the normalized spectrogram of FIG. 5.

FIG. 6 is an example of a normalized and weighted spectrogram 600 generated by the point selector 208 of FIG. 2 from the normalized spectrogram 500 of FIG. 5. The example spectrogram 600 includes the example vertical axis 308 of FIG. 3 and the example horizontal axis 310 of FIG. 3. The example normalized and weighted spectrogram 600 is divided into example audio signal frequency components 502. In the illustrated example, the example audio signal frequency components 502 each have an example frequency range 408 and example time period 410. The example audio signal frequency components 502 include an example first audio signal frequency component 604A and an example second audio signal frequency component 604B. In some examples, the first and second audio signal frequency components 604A and 604B correspond to the same frequency bins and time periods as the first and second audio signal frequency components 412A and 412B of FIG. 3, respectively. In the illustrated example, the darker portions of the normalized and weighted spectrogram 600 represent areas of the audio spectrum with higher energies.

The example normalized and weighted spectrogram 600 is generated by weighing the normalized spectrogram 600 with a range of values from zero to one based on a category of the audio signal 106. For example, if the audio signal 106 is music, areas of the audio spectrum associated with music will be weighted along each column by the point selector 208 of FIG. 2. In other examples, the weighting can apply to multiple columns and can take on a different range from zero to one.

Figure 7:
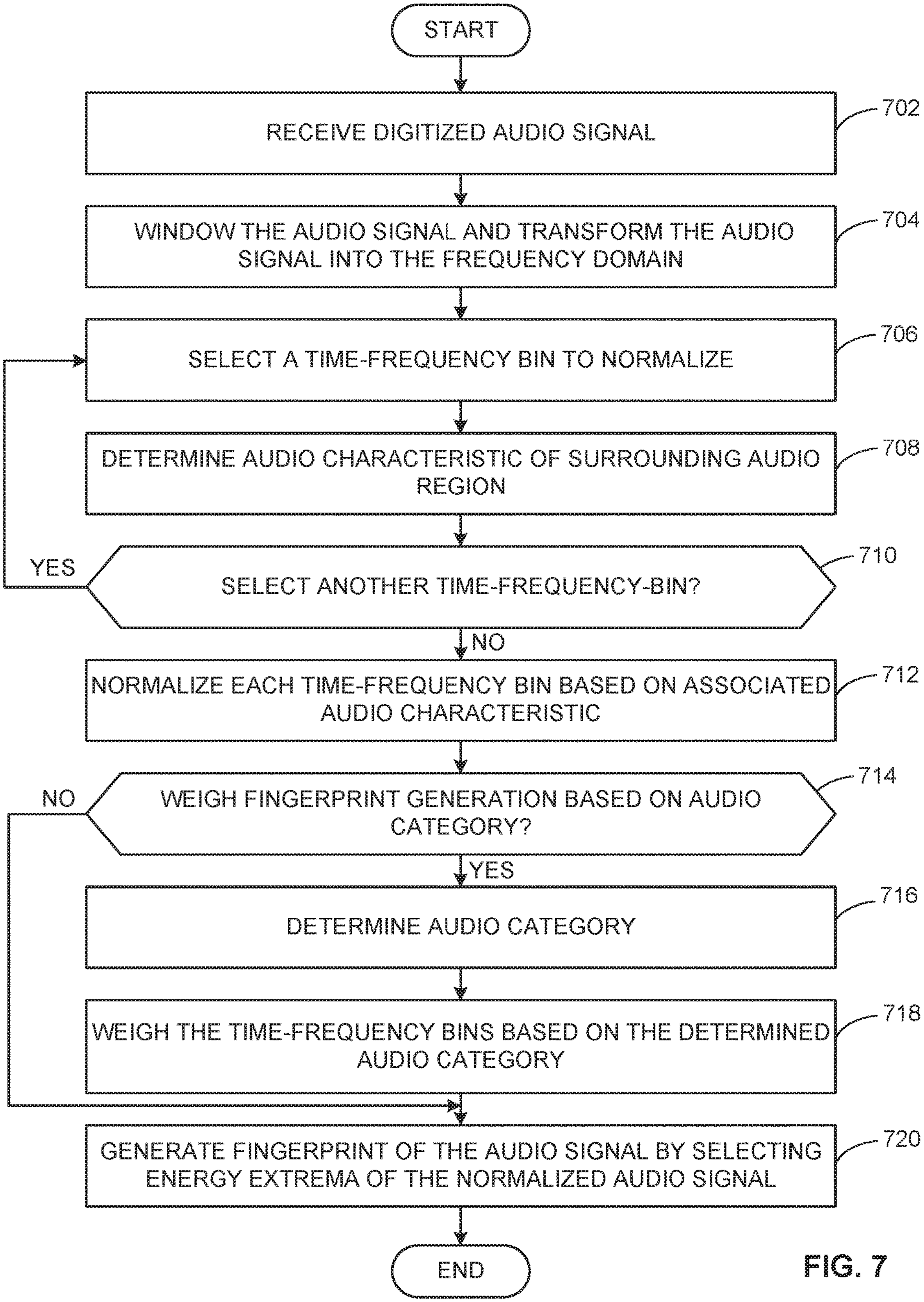
FIGS. 7 and 8 are flowcharts representative of machine readable instructions that may be executed to implement the audio processor of FIG. 2.
Figure 8:
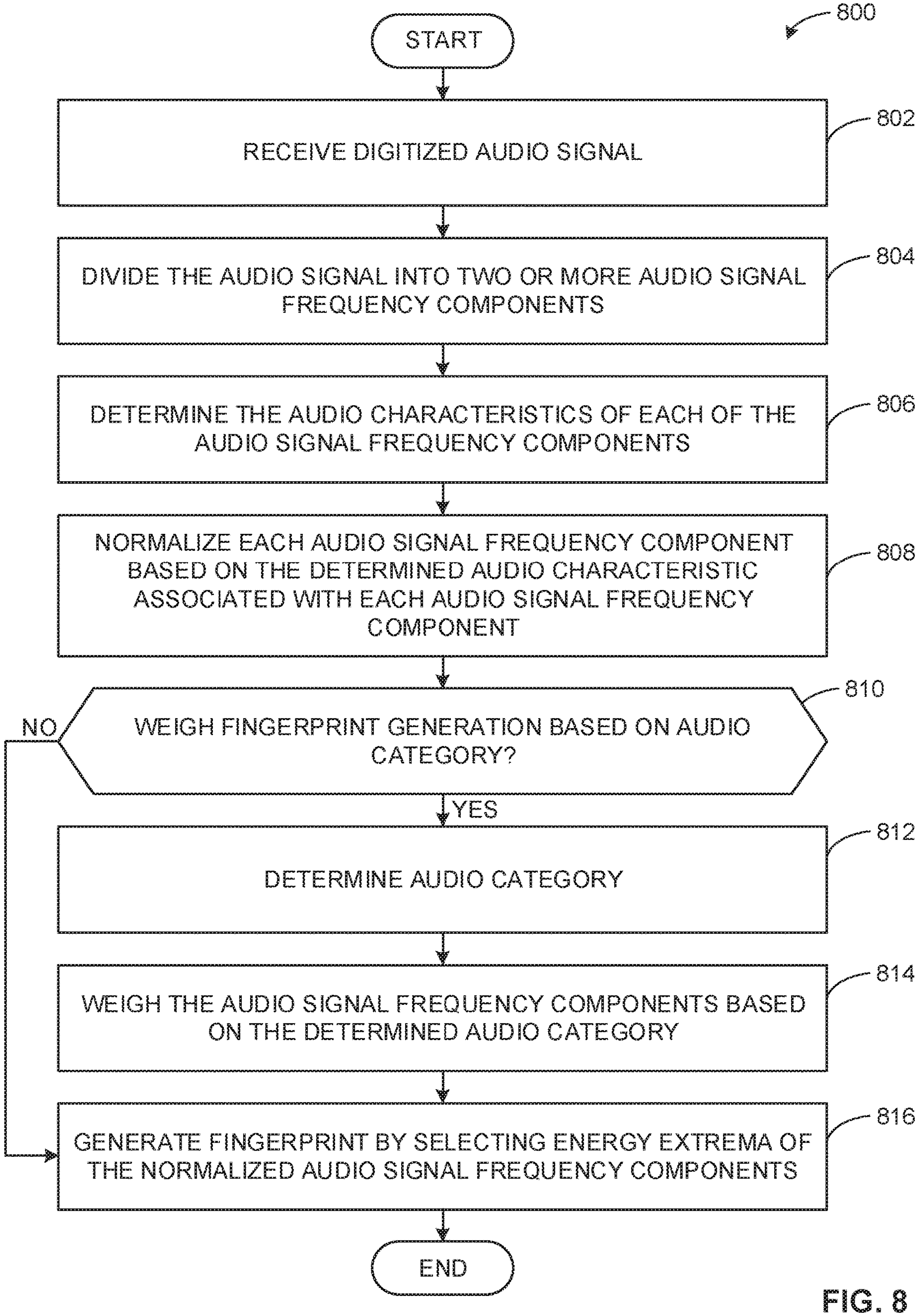

Flowcharts representative of example hardware logic, machine readable instructions, hardware implemented state machines, and/or any combination thereof for implementing the audio processor 108 of FIG. 2 are shown in FIGS. 7 and 8. The machine readable instructions may be an executable program or portion of an executable program for execution by a computer processor such as the processor 912 shown in the example processor platform 900 discussed below in connection with FIG. 9. The program may be embodied in software stored on a non-transitory computer readable storage medium such as a CD-ROM, a floppy disk, a hard drive, a DVD, a Blu-ray disk, or a memory associated with the processor 912, but the entire program and/or parts thereof could alternatively be executed by a device other than the processor 912 and/or embodied in firmware or dedicated hardware. Further, although the example programs are described with reference to the flowchart illustrated in FIGS. 7 and 8, many other methods of implementing the example audio processor 108 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example processes of FIGS. 7 and 8 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory, and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

The process of FIG. 7 begins at block 702. At block 702, the audio processor 108 receives the digitized audio signal 106. For example, the audio processor 108 can receive audio (e.g., emitted by the audio source 102 of FIG. 1, etc.) captured by the microphone 104. In this example, the microphone can include an analog to digital converter to convert the audio into a digitized audio signal 106. In other examples, the audio processor 108 can receive audio stored in a database (e.g., the volatile memory 914 of FIG. 9, the non-volatile memory 916 of FIG. 9, the mass storage 928 of FIG. 9, etc.). In other examples, the digitized audio signal 106 can transmitted to the audio processor 108 over a network (e.g., the Internet, etc.). Additionally or alternatively, the audio processor 108 can receive the audio signal 106 by any other suitable means.

At block 704, the frequency range separator 202 windows the audio signal 106 and transforms the audio signal 106 into the frequency domain. For example, the frequency range separator 202 can perform a fast Fourier transform to transform the audio signal 106 into the frequency domain and can perform a windowing function (e.g., a Hamming function, a Hann function, etc.). Additionally or alternatively, the frequency range separator 202 can aggregate the audio signal 106 into two or more time bins. In these examples, time-frequency bin corresponds to an intersection of a frequency bin and a time bin and contains a portion of the audio signal 106.

At block 706, the audio characteristic determiner 204 selects a time-frequency bin to normalize. For example, the audio characteristic determiner 204 can select the first time-frequency bin 304A of FIG. 3A. In some examples, the audio characteristic determiner 204 can select a time-frequency bin adjacent to a previously selected first time-frequency bin.

At block 708, the audio characteristic determiner 204 determines the audio characteristic of the surrounding audio region. For example, if the audio characteristic determiner 204 selected the first time-frequency bin 304A, the audio characteristic determiner 204 can determine an audio characteristic of the first audio region 306A. In some examples, the audio characteristic determiner 204 can determine the mean energy of the audio region. In other examples, the audio characteristic determiner 204 can determine any other suitable audio characteristic(s) (e.g., mean amplitude, etc.).

At block 710, the audio characteristic determiner 204 determines if another time-frequency bin is to be selected, the process 700 returns to block 706. If another time-frequency bin is not to be selected, the process 700 advances to block 712. In some examples, blocks 706-710 are repeated until every time-frequency bin of the unprocessed spectrogram 300 has been selected. In other examples, blocks 706-710 can be repeated any suitable number iterations.

At block 712, the signal normalizer 206 normalizes each time-frequency bin based on the associated audio characteristic. For example, the signal normalizer 206 can normalize each of the selected time-frequency bins at block 706 with the associated audio characteristic determined at block 708. For example, the signal normalizer can normalize the first time-frequency bin 304A and the second time-frequency bin 304B by the audio characteristics (e.g., mean energy) of the first audio region 306A and the second audio region 306B, respectively. In some examples, the signal normalizer 206 generates a normalized spectrogram (e.g., the normalized spectrogram 302 of FIG. 3C) based on the normalization of the time-frequency bins.

At block 714, the point selector 208 determines if fingerprint generation is to be weighed based on audio category, the process 700 advances to block 716. If fingerprint generation is not to be weighed based on audio category, the process 700 advances to block 720. At block 716, the point selector 208 determines the audio category of the audio signal 106. For example, the point selector 208 can present a user with a prompt to indicate the category of the audio (e.g., music, speech, sound effects, advertisements, etc.). In other examples, the audio processor 108 can use an audio category determining algorithm to determine the audio category. In some examples, the audio category can be the voice of a specific person, human speech generally, music, sound effects and/or advertisement.

At block 718, the point selector 208 weighs the time frequency bins based on the determined audio category. For example, if the audio category is music, the point selector 208 can weigh the audio signal frequency component associated with treble and bass ranges commonly associated with music. In some examples, if the audio category is a specific person's voice, the point selector 208 can weigh audio signal frequency components associated with that person's voice. In some examples, the output of the signal normalizer 206 can be represented as a spectrogram.

At block 720, the fingerprint generator 210 generates a fingerprint (e.g., the fingerprint 110 of FIG. 1) of the audio signal 106 by selecting energy extrema of the normalized audio signal. For example, the fingerprint generator 210 can use the frequency, time bin and energy associated with one or more energy extrema (e.g., an extremum, twenty extrema, etc.). In some examples, the fingerprint generator 210 can select energy maxima of the normalized audio signal 106. In other examples, the fingerprint generator 210 can select any other suitable features of the normalized audio signal frequency components. In some examples, the fingerprint generator 210 can utilize any suitable means (e.g., algorithm, etc.) to generate a fingerprint 110 representative of the audio signal 106. Once a fingerprint 110 has been generate, the process 700 ends.

The process 800 of FIG. 8 begins at block 802. At block 802, the audio processor 108 receives the digitized audio signal. For example, the audio processor 108 can receive audio (e.g., emitted by the audio source 102 of FIG. 1, etc.) and captured by the microphone 104. In this example, the microphone can include an analog to digital converter to convert the audio into a digitized audio signal 106. In other examples, the audio processor 108 can receive audio stored in a database (e.g., the volatile memory 914 of FIG. 9, the non-volatile memory 916 of FIG. 9, the mass storage 928 of FIG. 9, etc.). In other examples, the digitized audio signal 106 can transmitted to the audio processor 108 over a network (e.g., the Internet, etc.). Additionally or alternatively, the audio processor 108 can receive the audio signal 106 by any suitable means.

At block 804, the frequency range separator 202 divides the audio signal into two or more audio signal frequency components (e.g., the audio signal frequency components 402 of FIG. 3, etc.). For example, the frequency range separator 202 can perform a fast Fourier transform to transform the audio signal 106 into the frequency domain and can perform a windowing function (e.g., a Hamming function, a Hann function, etc.) to create frequency bins. In these examples, each audio signal frequency component is associated with one or more frequency bin(s) of the frequency bins. Additionally or alternatively, the frequency range separator 202 can further divide the audio signal 106 into two or more time periods. In these examples, each audio signal frequency component corresponds to a unique combination of a time period of the two or more time periods and a frequency bin of the two or more frequency bins. For example, the frequency range separator 202 can divide the audio signal 106 into a first frequency bin, a second frequency bin, a first time period and a second time period. In this example, a first audio signal frequency component corresponds to the portion of the audio signal 106 within the first frequency bin and the first time period, a second audio signal frequency component corresponds to the portion of the audio signal 106 within the first frequency bin and the second time period, a third audio signal frequency component corresponds to the portion of the audio signal 106 within the second frequency bin and the first time period and a fourth audio signal frequency portion corresponds to the component of the audio signal 106 within the second frequency bin and the second time period. In some examples, the output of the frequency range separator 202 can be represented as a spectrograph (e.g., the unprocessed spectrogram 300 of FIG. 3).

At block 806, the audio characteristic determiner 204 determines the audio characteristics of each audio signal frequency component. For example, the audio characteristic determiner 204 can determine the mean energy of each audio signal frequency component. In other examples, the audio characteristic determiner 204 can determine any other suitable audio characteristic(s) (e.g., mean amplitude, etc.).

At block 808, the signal normalizer 206 normalizes each audio signal frequency component based on the determined audio characteristic associated with the audio signal frequency component. For example, the signal normalizer 206 can normalize each audio signal frequency component by the mean energy associated with the audio signal frequency component. In other examples, the signal normalizer 206 can normalize the audio signal frequency component using any other suitable audio characteristic. In some examples, the output of the signal normalizer 206 can be represented as a spectrograph (e.g., the normalized spectrogram 500 of FIG. 5).

At block 810, audio characteristic determiner 204 determines if fingerprint generation is to be weighed based on audio category, the process 800 advances to block 812. If fingerprint generation is not to be weighed based on audio category, the process 800 advances to block 816. At block 812, the audio processor 108 determines the audio category of the audio signal 106. For example, the audio processor 108 can present a user with a prompt to indicate the category of the audio (e.g., music, speech, etc.). In other examples, the audio processor 108 can use an audio category determining algorithm to determine the audio category. In some examples, the audio category can be the voice of a specific person, human speech generally, music, sound effects and/or advertisement.

At block 814, the signal normalizer 206 weighs the audio signal frequency components based on the determined audio category. For example, if the audio category is music, the signal normalizer 206 can weigh the audio signal frequency component along each column with a different scaler value from zero to one for each frequency location from treble to bass associated with the average spectral envelope of music. In some examples, if the audio category is a human voice, the signal normalizer 206 can weigh audio signal frequency components associated with the spectral envelope of a human voice. In some examples, the output of the signal normalizer 206 can be represented as a spectrograph (e.g., the spectrogram 600 of FIG. 6).

At block 816, the fingerprint generator 210 generates a fingerprint (e.g., the fingerprint 110 of FIG. 1) of the audio signal 106 by selecting energy extrema of the normalized audio signal frequency components. For example, the fingerprint generator 210 can use the frequency, time bin and energy associated with one or more energy extrema (e.g., twenty extrema, etc.). In some examples, the fingerprint generator 210 can select energy maxima of the normalized audio signal. In other examples, the fingerprint generator 210 can select any other suitable features of the normalized audio signal frequency components. In some examples, the fingerprint generator 210 can utilize another suitable means (e.g., algorithm, etc.) to generate a fingerprint 110 representative of the audio signal 106. Once a fingerprint 110 has been generate, the process 800 ends.

Figure 9:
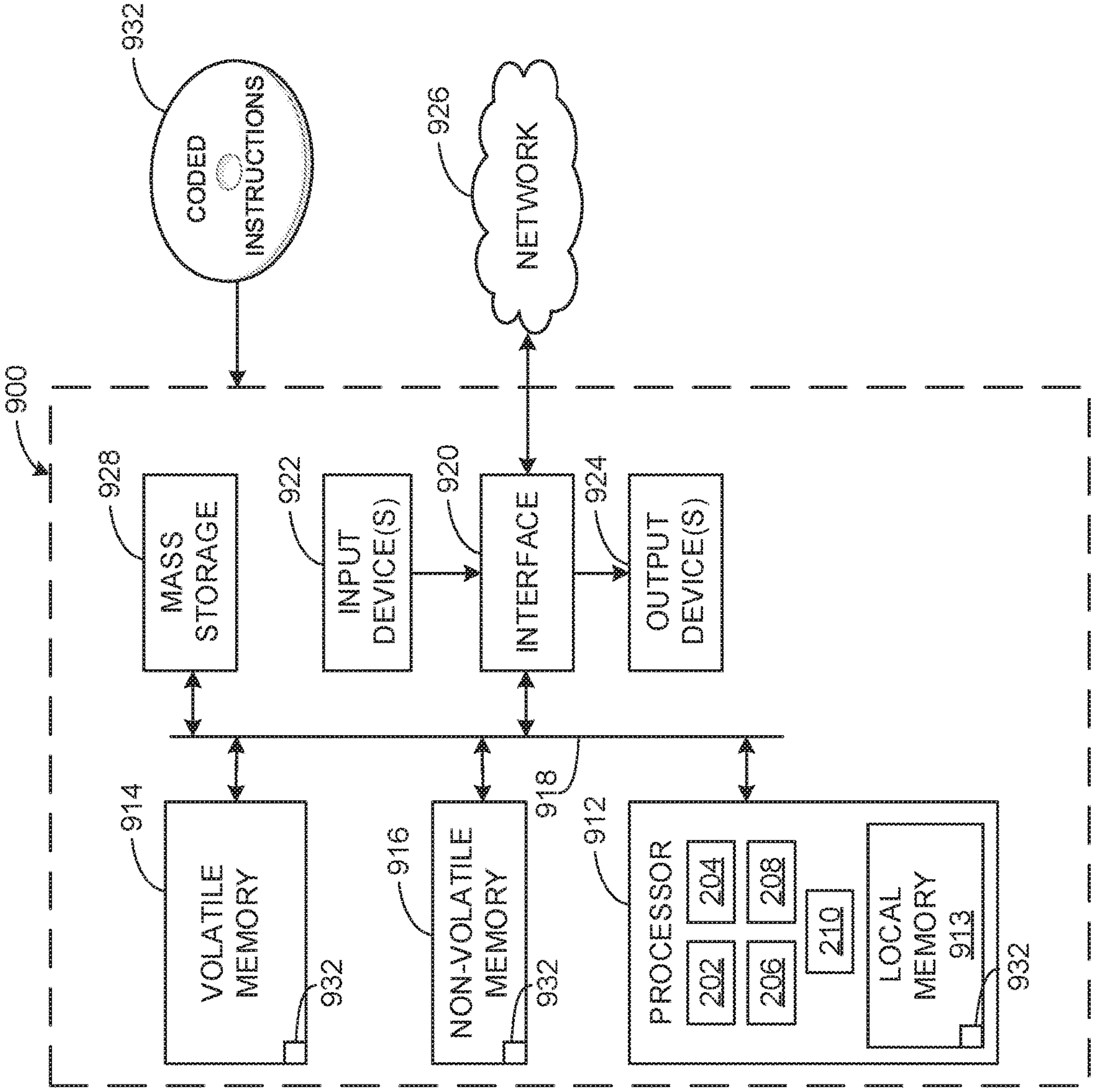
FIG. 9 is a block diagram of an example processing platform structured to execute the instructions of FIGS. 7 and 8 to implement the audio processor of FIG. 2.

FIG. 9 is a block diagram of an example processor platform 900 structured to execute the instructions of FIGS. 7 and/or 8 to implement the audio processor 108 of FIG. 2. The processor platform 900 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 900 of the illustrated example includes a processor 912. The processor 912 of the illustrated example is hardware. For example, the processor 912 can be implemented by one or more integrated circuits, logic circuits, microprocessors, GPUs, DSPs, or controllers from any desired family or manufacturer. The hardware processor may be a semiconductor based (e.g., silicon based) device. In this example, the processor 912 implements the example frequency range separator 202, the example audio characteristic determiner 204, the example signal normalizer 206, the example point selector 208 and an example fingerprint generator 210.

The processor 912 of the illustrated example includes a local memory 913 (e.g., a cache). The processor 912 of the illustrated example is in communication with a main memory including a volatile memory 914 and a non-volatile memory 916 via a bus 918. The volatile memory 914 may be implemented by Synchronous Dynamic Random Access Memory (SDRAM), Dynamic Random Access Memory (DRAM), RAMBUS® Dynamic Random Access Memory (RDRAM®), and/or any other type of random access memory device. The non-volatile memory 916 may be implemented by flash memory and/or any other desired type of memory device. Access to the main memory 914, 916 is controlled by a memory controller.

The processor platform 900 of the illustrated example also includes an interface circuit 920. The interface circuit 920 may be implemented by any type of interface standard, such as an Ethernet interface, a universal serial bus (USB), a Bluetooth® interface, a near field communication (NFC) interface, and/or a PCI express interface.

In the illustrated example, one or more input devices 922 are connected to the interface circuit 920. The input device(s) 922 permit(s) a user to enter data and/or commands into the processor 912. The input device(s) 922 can be implemented by, for example, an audio sensor, a microphone, a camera (still or video), and/or a voice recognition system.

One or more output devices 924 are also connected to the interface circuit 920 of the illustrated example. The output devices 924 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer, and/or speaker. The interface circuit 920 of the illustrated example, thus, typically includes a graphics driver card, a graphics driver chip, and/or a graphics driver processor.

The interface circuit 920 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 926. The communication can be via, for example, an Ethernet connection, a digital subscriber line (DSL) connection, a telephone line connection, a coaxial cable system, a satellite system, a line-of-site wireless system, a cellular telephone system, etc.

The processor platform 900 of the illustrated example also includes one or more mass storage devices 928 for storing software and/or data. Examples of such mass storage devices 928 include floppy disk drives, hard drive disks, compact disk drives, Blu-ray disk drives, redundant array of independent disks (RAID) systems, and digital versatile disk (DVD) drives.

The machine executable instructions 932 to implement the methods of FIG. 6 may be stored in the mass storage device 928, in the volatile memory 914, in the non-volatile memory 916, and/or on a removable non-transitory computer readable storage medium such as a CD or DVD.

From the foregoing, it will be appreciated that example methods and apparatus have been disclosed that allow fingerprints of audio signal to be created that reduces the amount noise captured in the fingerprint. Additionally, by sampling audio from less energetic regions of the audio signal, more robust audio fingerprints are created when compared to previous used audio fingerprinting methods.

Although certain example methods, apparatus, and articles of manufacture have been disclosed herein, the scope of coverage of this patent is not limited thereto. On the contrary, this patent covers all methods, apparatus, and articles of manufacture fairly falling within the scope of the claims of this patent.

What is claimed is:

1. An apparatus for audio fingerprinting, comprising:

a frequency range separator to transform an audio signal into a frequency domain, the transformed audio signal including a plurality of time-frequency bins, each of the time-frequency bins corresponding to an intersection of a frequency bin and a time bin and contains a portion of the audio signal;

an audio characteristic determiner to:

select a first time-frequency bin;

determine a group of the plurality of time-frequency bins based on the first time-frequency bin and time-frequency bins within a pre-defined distance of the first time-frequency bin;

determine an audio characteristic for an audio region comprising the group of the plurality of time-frequency bins, wherein the determined audio characteristic for the audio region includes at least one of: (i) a mean energy value; (ii) a mode energy value (iii) an average power value; (iv) a mode power value; or (v) a mean amplitude of the group of the plurality of time-frequency bins;

select a second time-frequency bin;

determine a second group of the plurality of time-frequency bins based on the second time-frequency bin and time-frequency bins within a pre-defined distance of the second time-frequency bin, wherein at least a portion of the group of time-frequency bins overlaps at least a portion of the second group of time-frequency bins; and determine a second audio characteristic for a second audio region comprising the second group of the plurality of time frequency bins;

a signal normalizer to:

normalize the audio region to generate normalized energy values, wherein normalizing the audio region comprises normalizing each portion of the audio signal of each time-frequency bin of the group of the plurality of time-frequency bins based on the determined audio characteristic associated with the audio region; and normalize the second audio region to generate second normalized energy values, wherein normalizing the second audio region comprises normalizing each portion of the audio signal of each time-frequency bin of the second group of the plurality of time-frequency bins based on the determined second audio characteristic associated with the second audio region;

a point selector configured to:

determine a category of the audio signal;

weigh each of the time-frequency bins of the group of the plurality of time-frequency bins based on the determined category of the audio signal; and weigh the selecting of the one of the normalized energy values by the category of the audio signal; and select one of the normalized energy values; and a fingerprint generator to generate a fingerprint of the audio signal using the selected one of the normalized energy values.

2. The apparatus of claim 1, wherein the frequency range separator is further configured to perform a fast Fourier transform of the audio signal.

3. The apparatus of claim 1, wherein the category of the audio signal includes at least one or music, human speech, sound effects, or advertisement.

4. The apparatus of claim 1, wherein the point selector selects the one of the normalized energy values based on an energy extrema of the normalized audio region.

5. The apparatus of claim 1, wherein each time-frequency bin of the plurality of time-frequency bins is a unique combination of (1) a time period of the transformed audio signal and (2) a frequency bin of the transformed audio signal.

6. A method for audio fingerprinting, comprising:

transforming an audio signal into a frequency domain, the transformed audio signal including a plurality of time-frequency bins, each of the time-frequency bins corresponding to an intersection of a frequency bin and a time bin and contains a portion of the audio signal;

selecting a first time-frequency bin;

determining a group of the plurality of time-frequency bins based on the first time-frequency bin and time-frequency bins within a pre-defined distance of the first time-frequency bin;

determining an audio characteristic for an audio region comprising the group of the plurality of time-frequency bins, wherein the determined audio characteristic for the audio region includes at least one of: (i) a mean energy value; (ii) a mode energy value (iii) an average power value; (iv) a mode power value; or (v) a mean amplitude of the group of the plurality of time-frequency bins;

selecting a second time-frequency bin;

determining a second group of the plurality of time-frequency bins based on the second time-frequency bin and time-frequency bins within a pre-defined distance of the second time-frequency bin, wherein at least a portion of the group of time-frequency bins overlaps at least a portion of the second group of time-frequency bins;

determining a second audio characteristic for a second audio region comprising the second group of the plurality of time frequency bins;

normalizing the audio region to generate normalized energy values, wherein normalizing the audio region comprises normalizing each portion of the audio signal of each time-frequency bin of the group of the plurality of time-frequency bins based on the determined audio characteristic associated with the audio region;

normalizing the second audio region to generate second normalized energy values, wherein normalizing the second audio region comprises normalizing each portion of the audio signal of each time-frequency bin of the second group of the plurality of time-frequency bins based on the determined second audio characteristic associated with the second audio region;

selecting one of the normalized energy values, wherein selecting one of the normalized energy values comprises:

determining a category of the audio signal;

weighing each of the time-frequency bins of the group of the plurality of time-frequency bins based on the determined category of the audio signal; and weighing the selecting of the one of the normalized energy values by the category of the audio signal; and generating a fingerprint of the audio signal using the selected one of the normalized energy values.

7. The method of claim 6, wherein the transforming the audio signal into the frequency domain includes performing a fast Fourier transform of the audio signal.

8. The method of claim 6, wherein the category of the audio signal includes at least one of music, human speech, sound effects, or advertisement.

9. The method of claim 6, wherein the selecting the one of the normalized energy values is based on an energy extrema of the normalized audio region.

10. The method of claim 6, wherein each time-frequency bin of the plurality of time-frequency bins is a unique combination of (1) a time period of the transformed audio signal and (2) a frequency bin of the transformed audio signal.

11. A non-transitory computer readable storage medium comprising instructions which, when executed, cause a processor to at least:

transform an audio signal into a frequency domain, the transformed audio signal including a plurality of time-frequency bins, each of the time-frequency bins corresponding to an intersection of a frequency bin and a time bin and contains a portion of the audio signal;

select a first time-frequency bin;

determine a group of the plurality of time-frequency bins based on the first time-frequency bin and time-frequency bins within a pre-defined distance of the first time-frequency bin;

determine an audio characteristic for an audio region comprising the group of the plurality of time-frequency bins, wherein the determined audio characteristic for the audio region includes at least one of: (i) a mean energy value; (ii) a mode energy value (iii) an average power value; (iv) a mode power value; or (v) a mean amplitude of the group of the plurality of time-frequency bins;

select a second time-frequency bin;

determine a second group of the plurality of time-frequency bins based on the second time-frequency bin and time-frequency bins within a pre-defined distance of the second time-frequency bin, wherein at least a portion of the group of time-frequency bins overlaps at least a portion of the second group of time-frequency bins;

determine a second audio characteristic for a second audio region comprising the second group of the plurality of time frequency bins;

normalize the audio region to generate normalized energy values, wherein normalizing the audio region comprises normalizing each portion of the audio signal of each time-frequency bin of the group of the plurality of time-frequency bins based on the determined audio characteristic associated with the audio region;

normalize the second audio region to generate second normalized energy values, wherein normalizing the second audio region comprises normalizing each portion of the audio signal of each time-frequency bin of the second group of the plurality of time-frequency bins based on the determined second audio characteristic associated with the second audio region;

select one of the normalized energy values, wherein selecting one of the normalized energy values comprises:

determining a category of the audio signal;

weighing each of the time-frequency bins of the group of the plurality of time-frequency bins based on the determined category of the audio signal; and weighing the selecting of the one of the normalized energy values by the category of the audio signal; and generate a fingerprint of the audio signal using the selected one of the normalized energy values.

12. The non-transitory computer readable storage medium of claim 11, wherein the transformation of the audio signal into the frequency domain includes performing a fast Fourier transform of the audio signal.

13. The non-transitory computer readable storage medium of claim 11, wherein the category of the audio signal includes at least one of music, human speech, sound effects, or advertisement.

14. An apparatus comprising:

at least one memory;

programmable circuitry; and instructions to cause the programmable circuitry to:

transform an audio signal into a frequency domain, the transformed audio signal including a plurality of time-frequency bins, each of the time-frequency bins corresponding to an intersection of a frequency bin and a time bin and contains a portion of the audio signal;

select a first time-frequency bin;

determine a group of the plurality of time-frequency bins based on the first time-frequency bin and time-frequency bins within a pre-defined distance of the first time-frequency bin;

determine an audio characteristic for an audio region comprising the group of the plurality of time-frequency bins, wherein the determined audio characteristic for the audio region includes at least one of: (i) a mean energy value; (ii) a mode energy value (iii) an average power value; (iv) a mode power value; or (v) a mean amplitude of the group of the plurality of time-frequency bins;

select a second time-frequency bin;

determine a second group of the plurality of time-frequency bins based on the second time-frequency bin and time-frequency bins within a pre-defined distance of the second time-frequency bin, wherein at least a portion of the group of time-frequency bins overlaps at least a portion of the second group of time-frequency bins;

determine a second audio characteristic for a second audio region comprising the second group of the plurality of time frequency bins;

normalize the audio region to generate normalized energy values, wherein normalizing the audio region comprises normalizing each portion of the audio signal of each time-frequency bin of the group of the plurality of time-frequency bins based on the determined audio characteristic associated with the audio region;

normalize the second audio region to generate second normalized energy values, wherein normalizing the second audio region comprises normalizing each portion of the audio signal of each time-frequency bin of the second group of the plurality of time-frequency bins based on the determined second audio characteristic associated with the second audio region;

select one of the normalized energy values, wherein selecting one of the normalized energy values comprises:

determining a category of the audio signal;

weighing each of the time-frequency bins of the group of the plurality of time-frequency bins based on the determined category of the audio signal; and weighing the selecting of the one of the normalized energy values by the category of the audio signal; and generate a fingerprint of the audio signal using the selected one of the normalized energy values.

15. The apparatus of claim 14, wherein the transformation of the audio signal into the frequency domain includes performing a fast Fourier transform of the audio signal.

16. The apparatus of claim 14, wherein the category of the audio signal includes at least one of music, human speech, sound effects, or advertisement.

17. The apparatus of claim 14, wherein each time-frequency bin of the plurality of time-frequency bins is a unique combination of (1) a time period of the transformed audio signal and (2) a frequency bin of the transformed audio signal.

* * * * *